US012633984B2

(12) United States Patent
Ahmed Salem et al.

(10) Patent No.: US 12,633,984 B2
(45) Date of Patent: May 19, 2026

(54) APPARATUS FOR CSI REPORTING OVERHEAD REDUCTION VIA JOINT CSI REPORT QUANTIZATION AND ENCODING

(71) Applicant: Nokia Technologies Oy, Espoo (FI)

(72) Inventors: Rana Ahmed Salem, Munich (DE); Youngsoo Yuk, Seoul (KR); Keeth Saliya Jayasinghe Laddu, Espoo (FI); Marco Maso, Issy les Moulineaux (FR); Filippo Tosato, Bures sur Yvette (FR); Salah Eddine Hajri, Antony (FR)

(73) Assignee: NOKIA TECHNOLOGIES OY, Espoo (FI)

( * ) Notice: Subject to any disclaimer, the term of this patent is extended or adjusted under 35 U.S.C. 154(b) by 456 days.

(21) Appl. No.: 18/019,910

(22) PCT Filed: Aug. 7, 2020

(86) PCT No.: PCT/EP2020/072249

§ 371 (c)(1),
(2) Date: Feb. 6, 2023

(87) PCT Pub. No.: WO2022/028711

PCT Pub. Date: Feb. 10, 2022

(65) Prior Publication Data

US 2023/0283342 A1     Sep. 7, 2023

(51) Int. Cl.
    *H04B 7/06*        (2006.01)
    *H04B 17/318*      (2015.01)
          (Continued)

(52) U.S. Cl.
    CPC ......... *H04B 7/0626* (2013.01); *H04B 17/328* (2023.05); *H04L 5/0051* (2013.01); *H04W 72/21* (2023.01)

(58) Field of Classification Search
    CPC .. H04B 7/0626; H04B 17/328; H04B 7/0641; H04B 7/066; H04L 5/0051;
          (Continued)

(56) References Cited

U.S. PATENT DOCUMENTS

2009/0116570 A1*  5/2009  Bala ..................... H04L 1/0029
                                                        375/260
2017/0013641 A1*  1/2017  Patel .................... H04L 1/1671
          (Continued)

OTHER PUBLICATIONS

NTT Docomo, Inc. "Discussion on multi-beam enhancement," 3GPP TSG RAN WG1 #96, R1-1902813, Athens, Greece, Feb. 25-Mar. 1, 2019.
          (Continued)

*Primary Examiner* — Hassan A Phillips
*Assistant Examiner* — Muhammad Ainul Huda
(74) *Attorney, Agent, or Firm* — Carter, DeLuca & Farrell LLP

(57)          ABSTRACT

Techniques of generating CSI reports include designating at least one of the reports as a reference and the other reports as dependent on the reference. For example, a dependent CSI report may have a differential value of a CSI quantity rather than a raw value of the CSI quantity. Because generally for parameters in a CSI report, the differential quantity has a smaller range of values than the raw values of the CSI quantity, a quantization of the differential value of the CSI quantity will have fewer bits than the raw value; for example, for L1-RSRP, the raw value has 7 bits while the differential value has 4 bits. In another example, a dependent value of a CSI quantity is a flag indicating that the CSI quantity value is located in a reference CSI report.

1 Claim, 9 Drawing Sheets

(51) Int. Cl.
H04L 5/00 (2006.01)
H04W 72/21 (2023.01)
(58) Field of Classification Search
CPC ... H04L 25/0226; H04L 5/0057; H04L 25/02;
H04L 1/00; H04W 72/21
See application file for complete search history.

(56) References Cited

U.S. PATENT DOCUMENTS

| | | | | |
|---|---|---|---|---|
| 2019/0059013 A1* | 2/2019 | Rahman | ............... | H04L 5/0057 |
| 2019/0181936 A1* | 6/2019 | Park | ..................... | H04W 76/27 |
| 2019/0297603 A1 | 9/2019 | Guo et al. | | |
| 2020/0220631 A1* | 7/2020 | Onggosanusi | ....... | H04B 17/327 |
| 2022/0247459 A1* | 8/2022 | Faxer | .................. | H04B 7/0626 |

OTHER PUBLICATIONS

"3rd Generation Partnership Project; Technical Specification Group Radio Access Network; NR; Radio Resource Control (RRC) protocol specification (Release 16)", 3GPP TS 38.331 V16.0.0, Mar. 2020, pp. 1-835.
"3rd Generation Partnership Project; Technical Specification Group Radio Access Network; NR; Physical layer procedures for data (Release 16)", 3GPP TS 38.214 V16.1.0, Mar. 2020, pp. 1-151.
"New WID: Further enhancements on MIMO for NR", 3GPP TSG RAN Meeting #86, RP-193133, Agenda: 9.1.1, Samsung, Dec. 9-12, 2019, 5 pages.
"Enhancements on Multi-TRP/Panel Transmission", 3GPP TSG RAN WG1 #99 Meeting, R1-1912719, Agenda: 7.2.8.2, Nokia, Nov. 18-22, 2019, 15 pages.
"MU-CSI Rank extension parameter setting and UCI design", 3GPP TSG RAN WG1 Meeting #97, R1-1907315, Agenda: 7.2.8.1, Nokia, May 13-17, 2019, 13 pages.
"On multi-TRP and multi-panel", 3GPP TSG RAN WG1 Meeting #95, R1-1813271, Agenda: 7.2.8.2, Ericsson, Nov. 12-15, 2018, pp. 1-5.
"Enhancements on Multi-TRP/Panel Transmission", 3GPP TSG RAN WG1 Meeting #95, R1-1813003, Agenda: 7.2.8.2, Samsung, Nov. 12-16, 2018, 6 pages.
"Multi-TRP Enhancements", 3GPP TSG-RAN WG1 Meeting #95, R1-1813442, Agenda: 7.2.8.2, Qualcomm Incorporated, Nov. 12-16, 2018, pp. 1-20.
"CSI measurement enhancement for multi-TRP/panel transmission", 3GPP TSG RAN WG1 Meeting #96, R1-1903100, Agenda: 7.2.8.6, Huawei, Feb. 25-Mar. 1, 2019, 6 pages.
"3rd Generation Partnership Project; Technical Specification Group Radio Access Network; NR; Physical layer measurements (Release 16)", 3GPP TS 38.215, V16.1.0, Mar. 2020, pp. 1-22.
"3rd Generation Partnership Project; Technical Specification Group Radio Access Network; NR; Medium Access Control (MAC) protocol specification (Release 16)", 3GPP TS 38.321, V16.0.0, Mar. 2020, pp. 1-141.
Office Action received for corresponding European Patent Application No. 20753744.0, dated May 27, 2025, 5 pages.

* cited by examiner

Example Wireless Network 130

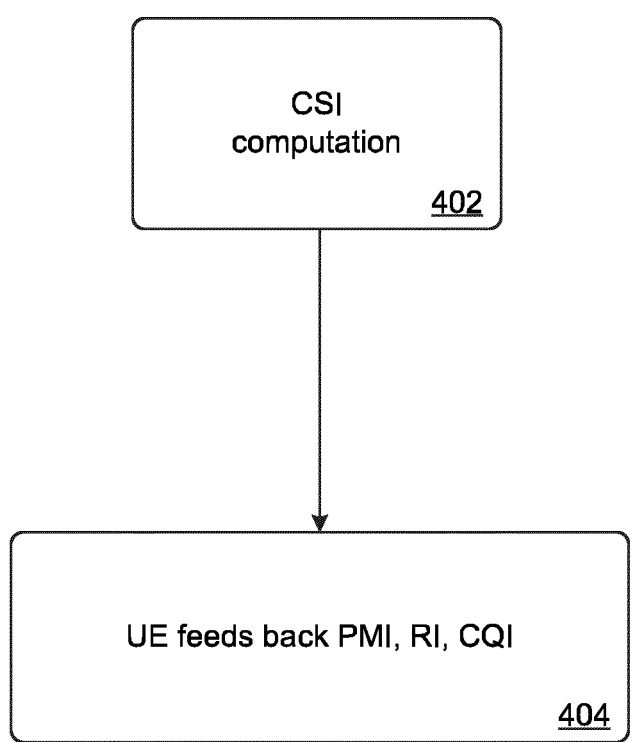
FIG. 4

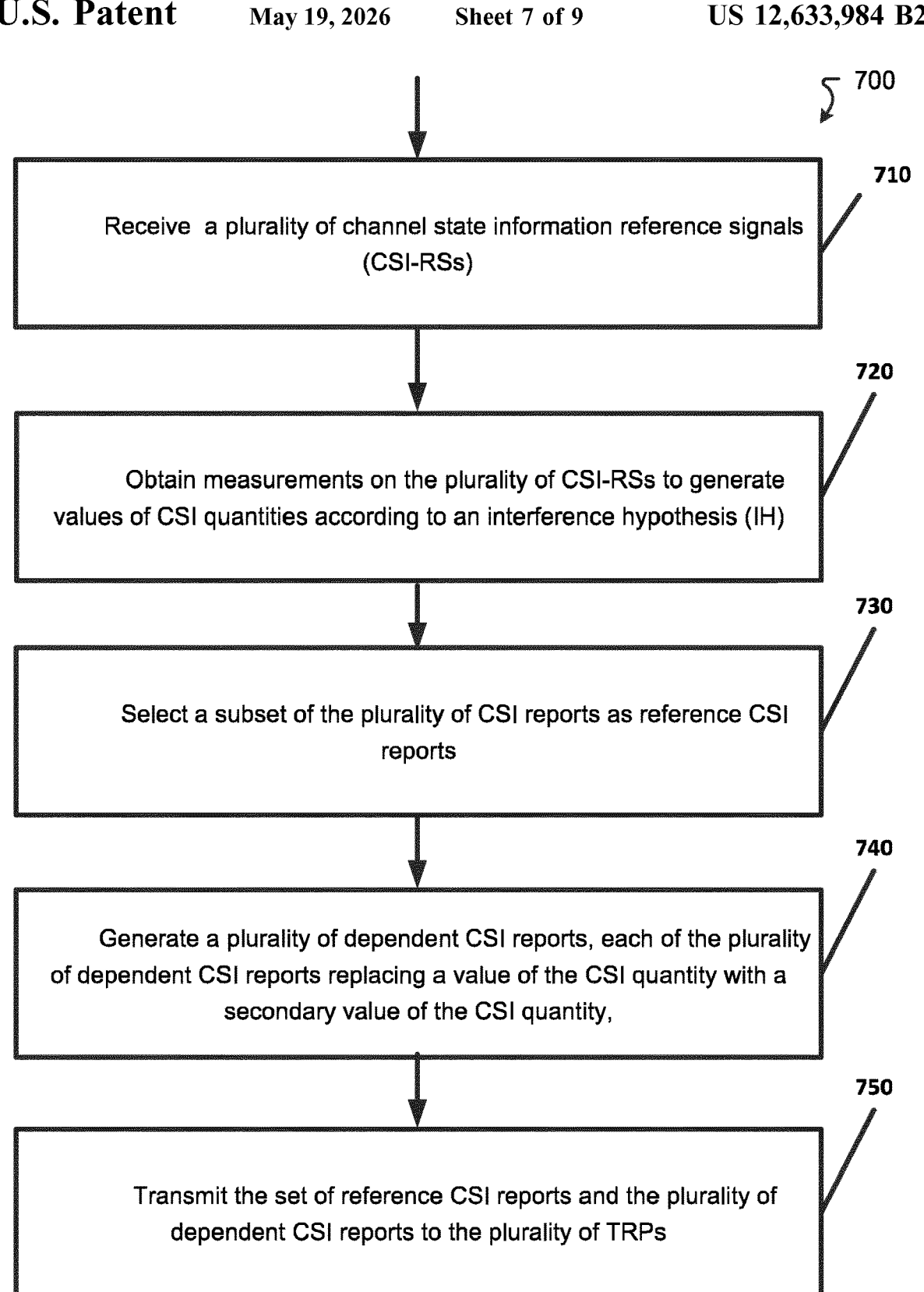

700

710

Receive a plurality of channel state information reference signals (CSI-RSs)

720

Obtain measurements on the plurality of CSI-RSs to generate values of CSI quantities according to an interference hypothesis (IH)

730

Select a subset of the plurality of CSI reports as reference CSI reports

740

Generate a plurality of dependent CSI reports, each of the plurality of dependent CSI reports replacing a value of the CSI quantity with a secondary value of the CSI quantity,

750

Transmit the set of reference CSI reports and the plurality of dependent CSI reports to the plurality of TRPs

Figure 8:
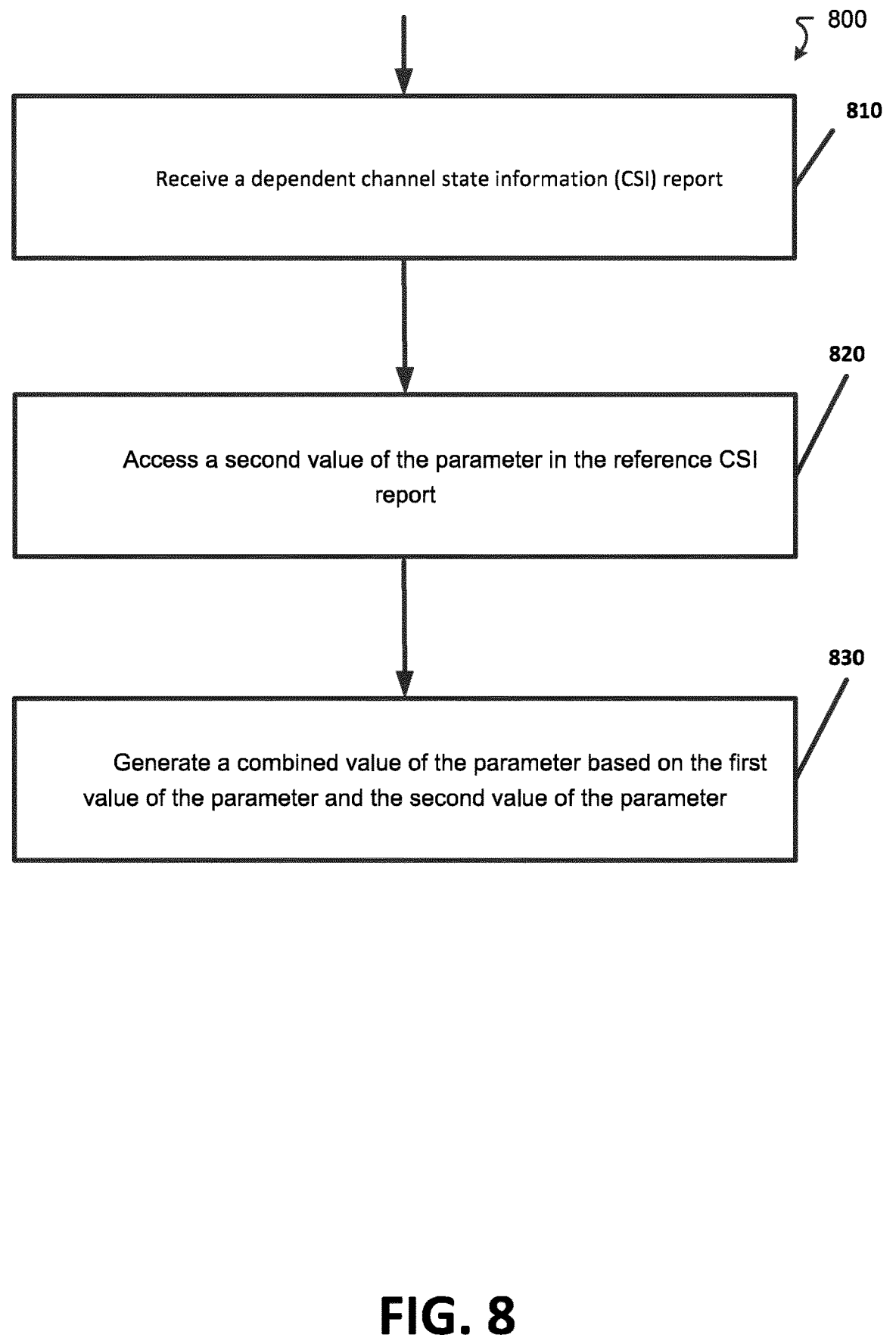

Receive a dependent channel state information (CSI) report

810

Access a second value of the parameter in the reference CSI report

820

Generate a combined value of the parameter based on the first value of the parameter and the second value of the parameter

APPARATUS FOR CSI REPORTING OVERHEAD REDUCTION VIA JOINT CSI REPORT QUANTIZATION AND ENCODING

CROSS REFERENCE TO RELATED APPLICATION

This patent application is a U.S. National Stage application of International Patent Application Number PCT/EP2020/072249 filed Aug. 7, 2020, which is hereby incorporated by reference in its entirety.

TECHNICAL FIELD

This description relates to communications.

BACKGROUND

A communication system may be a facility that enables communication between two or more nodes or devices, such as fixed or mobile communication devices. Signals can be carried on wired or wireless carriers.

An example of a cellular communication system is an architecture that is being standardized by the $3^{rd}$ Generation Partnership Project (3GPP). A recent development in this field is often referred to as the long-term evolution (LTE) of the Universal Mobile Telecommunications System (UMTS) radio-access technology. E-UTRA (evolved UNITS Terrestrial Radio Access) is the air interface of 3GPP's LTE upgrade path for mobile networks. In LTE, base stations or access points (APs), which are referred to as enhanced Node AP (eNBs), provide wireless access within a coverage area or cell. In LTE, mobile devices, or mobile stations are referred to as user equipment (UE). LTE has included a number of improvements or developments.

A global bandwidth shortage facing wireless carriers has motivated the consideration of the underutilized millimeter wave (mmWave) frequency spectrum for future broadband cellular communication networks, for example. mmWave (or extremely high frequency) may, for example, include the frequency range between 30 and 300 gigahertz (GHz). Radio waves in this band may, for example, have wavelengths from ten to one millimeters, giving it the name millimeter band or millimeter wave. The amount of wireless data will likely significantly increase in the coming years. Various techniques have been used in attempt to address this challenge including obtaining more spectrum, having smaller cell sizes, and using improved technologies enabling more bits/s/Hz. One element that may be used to obtain more spectrum is to move to higher frequencies, e.g., above 6 GHz. For fifth generation wireless systems (5G), an access architecture for deployment of cellular radio equipment employing mmWave radio spectrum has been proposed. Other example spectrums may also be used, such as cmWave radio spectrum (e.g., 3-30 GHz).

SUMMARY

According to an example implementation, a method includes receiving, by a user equipment (UE), a plurality of channel state information reference signals (CSI-RSs), each of the plurality of CSI-RSs being sent from a respective transmission and reception point (TRP) of a plurality of TRPs; obtaining, by the UE, measurements on the plurality of CSI-RSs to generate values of CSI quantities for a respective CSI report of a plurality of CSI reports, each CSI quantity being generated according to a respective interference hypothesis (IH) of a plurality of IHs, each of the plurality of IHs corresponding to a respective subset of the plurality of TRPs, each of the plurality of CSI reports having values of the CSI quantities; selecting, by the UE, a subset of the plurality of CSI reports as reference CSI reports of a set of reference CSI reports; generating, by the UE for the rest of the plurality of channels, a plurality of dependent CSI reports, each of the plurality of dependent CSI reports replacing a value of the CSI quantity with a secondary value of the CSI quantity, the secondary value of the CSI quantity included in that dependent CSI report, in combination with the value of the CSI quantity included in a reference CSI report of the set of reference CSI reports, producing the value of the CSI quantity of the channel of the plurality of channels; and transmitting the set of reference CSI reports and the plurality of dependent CSI reports to the plurality of TRPs.

According to an example implementation, an apparatus includes at least processor and at least one memory including computer program code, the at least one memory and the computer program code configured to, with the at least one processor, cause the apparatus at least to receive a plurality of channel state information reference signals (CSI-RSs), each of the plurality of CSI-RSs being sent from a respective transmission and reception point (TRP) of a plurality of TRPs; obtain measurements on the plurality of CSI-RSs to generate values of CSI quantities for a respective CSI report of a plurality of CSI reports, each CSI quantity being generated according to a respective interference hypothesis (IH) of a plurality of IHs, each of the plurality of IHs corresponding to a respective subset of the plurality of TRPs, each of the plurality of CSI reports having values of the CSI quantities; select a subset of the plurality of CSI reports as reference CSI reports of a set of reference CSI reports; generate, for the rest of the plurality of channels, a plurality of dependent CSI reports, each of the plurality of dependent CSI reports replacing a value of the CSI quantity with a secondary value of the CSI quantity, the secondary value of the CSI quantity included in that dependent CSI report, in combination with the value of the CSI quantity included in a reference CSI report of the set of reference CSI reports, producing the value of the CSI quantity of the channel of the plurality of channels; and transmit the set of reference CSI reports and the plurality of dependent CSI reports to the plurality of TRPs.

According to an example implementation, an apparatus includes means for receiving a plurality of channel state information reference signals (CSI-RSs), each of the plurality of CSI-RSs being sent from a respective transmission and reception point (TRP) of a plurality of TRPs; means for measurements on the plurality of CSI-RSs to generate values of CSI quantities for a respective CSI report of a plurality of CSI reports, each CSI quantity being generated according to a respective interference hypothesis (IH) of a plurality of IHs, each of the plurality of IHs corresponding to a respective subset of the plurality of TRPs, each of the plurality of CSI reports having values of the CSI quantities; means for a subset of the plurality of CSI reports as reference CSI reports of a set of reference CSI reports; means for generating, for the rest of the plurality of channels, a plurality of dependent CSI reports, each of the plurality of dependent CSI reports replacing a value of the CSI quantity with a secondary value of the CSI quantity, the secondary value of the CSI quantity included in that dependent CSI report, in combination with the value of the CSI quantity included in a reference CSI report of the set of reference CSI reports, producing the value of the CSI quantity of the channel of the plurality of channels; and transmitting the set of reference CSI reports and the plurality of dependent CSI reports to the plurality of TRPs.

According to an example implementation, a computer program product includes a computer-readable storage medium and storing executable code that, when executed by at least one data processing apparatus, is configured to cause the at least one data processing apparatus to receive a plurality of channel state information reference signals (CSI-RSs), each of the plurality of CSI-RSs being sent from a respective transmission and reception point (TRP) of a plurality of TRPs; obtain measurements on the plurality of CSI-RSs to generate values of CSI quantities for a respective CSI report of a plurality of CSI reports, each CSI quantity being generated according to a respective interference hypothesis (IH) of a plurality of IHs, each of the plurality of IHs corresponding to a respective subset of the plurality of TRPs, each of the plurality of CSI reports having values of the CSI quantities; select a subset of the plurality of CSI reports as reference CSI reports of a set of reference CSI reports; generate, for the rest of the plurality of channels, a plurality of dependent CSI reports, each of the plurality of dependent CSI reports replacing a value of the CSI quantity with a secondary value of the CSI quantity, the secondary value of the CSI quantity included in that dependent CSI report, in combination with the value of the CSI quantity included in a reference CSI report of the set of reference CSI reports, producing the value of the CSI quantity of the channel of the plurality of channels; and transmit the set of reference CSI reports and the plurality of dependent CSI reports to the plurality of TRPs.

According to an example implementation, a method includes receiving, by a first transmission and reception point (TRP) of a plurality of TRPs of a network, a dependent channel state information (CSI) report, the dependent CSI report including a first value of a CSI quantity and a pointer to a reference CSI report received by a second TRP of the network; accessing, by the first TRP, a second value of the CSI quantity in the reference CSI report; and generating, by the first TRP, a combined value of the CSI quantity based on the first value of the CSI quantity and the second value of the CSI quantity.

According to an example implementation, an apparatus includes at least processor and at least one memory including computer program code, the at least one memory and the computer program code configured to, with the at least one processor, cause the apparatus at least to receive a dependent channel state information (CSI) report, the CSI report including a first value of a CSI quantity and a pointer to a reference CSI report received by a second TRP of the network; access a second value of the CSI quantity in the reference CSI report; and generate a combined value of the CSI quantity based on the first value of the CSI quantity and the second value of the CSI quantity.

According to an example implementation, an apparatus including a first TRP includes means for receiving a dependent channel state information (CSI) report, the dependent CSI report including a first value of a CSI quantity and a pointer to a reference CSI report received by a second TRP of the network; means for accessing a second value of the CSI quantity in the reference CSI report; and means for generating a combined value of the CSI quantity based on the first value of the CSI quantity and the second value of the CSI quantity.

According to an example implementation, a computer program product includes a computer-readable storage medium and storing executable code that, when executed by at least one data processing apparatus including a first TRP, is configured to cause the at least one data processing apparatus to receive a dependent channel state information (CSI) report, the CSI report including a first value of a CSI quantity and a pointer to a reference CSI report received by a second TRP of the network; access a second value of the CSI quantity in the reference CSI report; and generate a combined value of the CSI quantity based on the first value of the CSI quantity and the second value of the CSI quantity.

The details of one or more examples of implementations are set forth in the accompanying drawings and the description below. Other features will be apparent from the description and drawings, and from the claims.

BRIEF DESCRIPTION OF THE DRAWINGS

FIG. 4 is a flow chart illustrating a process of providing feedback for a CSI report according to an example implementation.

FIG. 7 is a flow chart illustrating a process of providing CSI reports to multiple TRPs according to an example implementation.

FIG. 8 is a flow chart illustrating a process of obtaining CSI quantity values from a dependent CSI report according to an example implementation.

DETAILED DESCRIPTION

Figure 1:
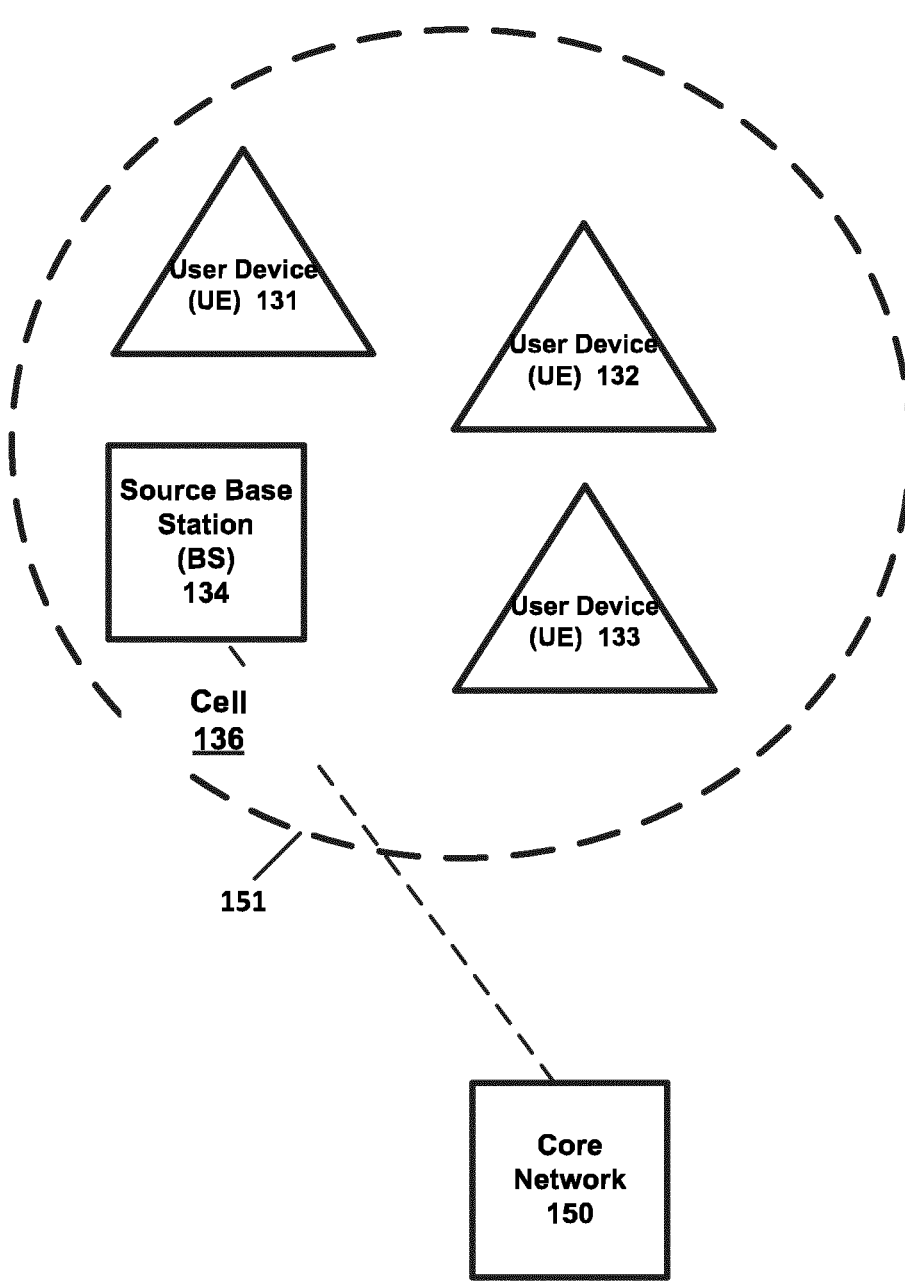
FIG. 1 is a block diagram of a digital communications network according to an example implementation.

FIG. 1 is a block diagram of a digital communications system such as a wireless network 130 according to an example implementation. In the wireless network 130 of FIG. 1, user devices 131, 132, 133 and 135, which may also be referred to as mobile stations (MSs) or user equipment (UEs), may be connected (and in communication) with a base station (BS) 134, which may also be referred to as an access point (AP), an enhanced Node B (eNB), a gNB (which may be a 5G base station) or a network node. At least part of the functionalities of an access point (AP), base station (BS) or (e)Node B (eNB) may be also be carried out by any node, server or host which may be operably coupled to a transceiver, such as a remote radio head. BS (or AP) 134 provides wireless coverage within a cell 136, including to user devices 131, 132, 133 and 135. Although only four user devices are shown as being connected or attached to BS 134, any number of user devices may be provided. BS 134 is also connected to a core network 150 via an interface 151. This is merely one simple example of a wireless network, and others may be used.

A user device (user terminal, user equipment (UE)) may refer to a portable computing device that includes wireless mobile communication devices operating with or without a subscriber identification module (SIM), including, but not limited to, the following types of devices: a mobile station (MS), a mobile phone, a cell phone, a smartphone, a personal digital assistant (PDA), a handset, a device using a wireless modem (alarm or measurement device, etc.), a laptop and/or touch screen computer, a tablet, a phablet, a game console, a notebook, and a multimedia device, as examples. It should be appreciated that a user device may also be a nearly exclusive uplink only device, of which an example is a camera or video camera loading images or video clips to a network.

In LTE (as an example), core network 150 may be referred to as Evolved Packet Core (EPC), which may include a mobility management entity (MME) which may handle or assist with mobility/handover of user devices between BSs, one or more gateways that may forward data and control signals between the BSs and packet data networks or the Internet, and other control functions or blocks.

The various example implementations may be applied to a wide variety of wireless technologies, wireless networks, such as LTE, LTE-A, 5G (New Radio, or NR), cmWave, and/or mmWave band networks, or any other wireless network or use case. LTE, 5G, cmWave and mmWave band networks are provided only as illustrative examples, and the various example implementations may be applied to any wireless technology/wireless network. The various example implementations may also be applied to a variety of different applications, services or use cases, such as, for example, ultra-reliability low latency communications (URLLC), Internet of Things (IoT), time-sensitive communications (TSC), enhanced mobile broadband (eMBB), massive machine type communications (MMTC), vehicle-to-vehicle (V2V), vehicle-to-device, etc. Each of these use cases, or types of UEs, may have its own set of requirements.

Rel-16 multi-TRP design for eMBB was mainly based on the non-coherent joint transmission, and two design choices are supported, namely, single PDCCH based multi-TRP transmission and multiple PDCCH based multi-TRP transmission, assuming ideal and non-ideal backhaul respectively.

The performance of the beamforming-intensive 5G air interface is conditioned on reliable channel state information (CSI) knowledge of the downlink (DL) channel at the gNB side, in order to be able to design the proper DL precoder, TX/RX beams, perform scheduling, link adaptation, etc.

In frequency division duplex (FDD) 5G systems, the gNB obtains DL channel information from UE CSI reporting. The UE measures downlink reference signals (e.g. CSI-RS, SSB) transmitted by the gNB, using which the UE computes downlink CSI and performs feedback according to the CSI reporting configuration in RRC. For PMI reporting, 5G NR Rel-15 and Rel-16 specified type I, multi-panel type I, type II, port selection type II, enhanced type II and enhanced port selection type II codebooks.

Figure 2:
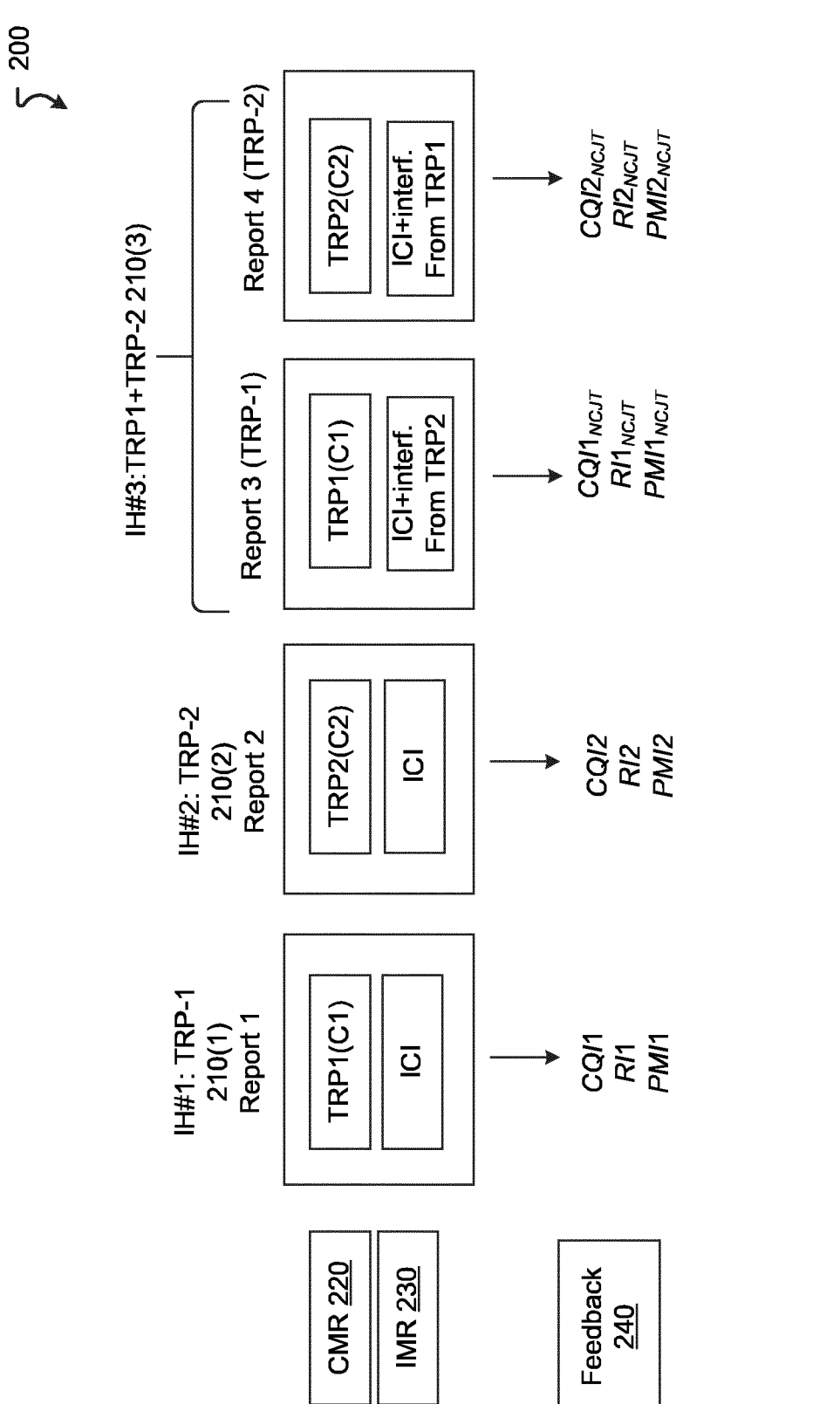
FIG. 2 is a diagram illustrating an CSI reports and interference hypotheses according to an example implementation.

If joint CSI measurement and reporting for the TRPs is employed, UE reports CSI parameters with the assumption of joint transmission by one or multiple TRPs, each assumption is referred to as an interference hypothesis (IH). Each report in an IH may consist of a subset or all of the following CSI components:

CQI: channel quality indicator, wideband or per sub-band.
PMI: precoding matrix indicator
CRI: CSI-RS resource indicator
RI: rank indicator
I1: wide band indication
SSBRI: SSB resource Indicator L1-RSRP: reference signal received power
L1-SINR: signal to interference and noise ratio After UE has fed back the required CSI reports, gNB can decide on the best transmission scheme to obtain the highest system throughput or to optimize other network KPIs. FIG. 2 depicts an example 200 with a cooperation set of N=2 TRPs. In example 200, a UE issue individual, decoupled reports 210(1) and 210(2) (IH1 and IH2) and reports from the pair hypothesis 210(3) (IH3). Within each of these reports, the results of channel measurement resources 220 and interference measurement resources 230 are recorded for feedback 240. Note that in case of ideal backhaul communication, in IH3 UE will feedback only 1 CQI value for both TRPs.

For an N-TRP cooperation set, the total number of interference hypotheses is $$\sum_{i=1}^{N} \binom{N}{i} = 2^N - 1.$$

The total number of reports within all interference hypotheses is $$\sum_{i=1}^{N} \binom{N}{i} i = N2^{N-1}.$$

For N=4 TRPs, there is a total number of 32 reports that a UE may need to feedback to gNB, which adds a huge burden on UL reporting resources. Depending on the configured CSI feedback quantities per report, uplink reporting resources (PUCCH/PUSCH) may fall short from fitting all the triggered reports which leads to some reports being fully or partially dropped.

In contrast, to the above described conventional approach to generating CSI reports for multiple TRPs, an improved technique includes designating at least one of the reports as a reference and the other reports as dependent on the reference. For example, a dependent CSI report may have a differential value of a CSI quantity rather than a raw value of the CSI quantity. Because generally for parameters in a CSI report, the differential quantity has a smaller range of values than the raw values of the CSI quantity, a quantization of the differential value of the CSI quantity will have fewer bits than the raw value; for example, for L1-RSRP, the raw value has 7 bits while the differential value has 4 bits. In another example, a dependent value of a CSI quantity is a flag indicating that the CSI quantity value is located in a reference CSI report.

It is noted that CSI reports for multiple interference hypotheses may contain redundant or correlated information. In other words, the improved technique aims to exploit the correlation among the different CSI reports present in different interference hypotheses to reduce the amount of UL overhead.

Advantageously, the above-described improved technique of generating CSI reports for multiple TRPs significantly reduces communication overhead by reducing the amount of data in the aggregation of the CSI reports. When uplink reporting resources (PUCCH/PUSCH) are limited, such a reduction in communications overhead reduces the likelihood of a report being dropped.

As an example, the PMIS to be used by a given TRP for single and joint TRP transmission, respectively, have, at least correlated wide band information (channel taps locations (delays), spatial support (port selection vectors, 2D DFT beams, . . . )). Additionally, the dynamic range of the CQI for single and joint TRP transmission is low enough to enable differential quantization without loss of performance. The same observation may be extended to L1-RSRP where, if the higher layer CSI quantity nrofReportedRS is configured to be larger than one, or if the higher layer CSI quantity groupBasedBeamReporting is configured as 'enabled', UE uses differential L1-RSRP based reporting, where the largest measured value of L1-RSRP is quantized to a 7-bit value in the range [−140, −44] dBm with 1 dB step size, and the differential L1-RSRP is quantized to a 4-bit value. The differential L1-RSRP value is computed with 2 dB step size with a reference to the largest measured L1-RSRP value which is part of the same L1-RSRP reporting instance. The dynamic range of L1-RSRP across CSI reports for the same TRP with different interference hypotheses is low. Consequently, joint L1-RSRP quantization across reports may provide non-negligible gains in terms of overhead.

The improved techniques include the following procedure:

The network configuring a UE with a joint encoding format for a set of CSI reporting configurations which may be
    a. associated with the same trigger state
    b. having the same slot periodicity and offset.

Joint encoding may only be used for a subset of the reported CSI quantities, depending on configuration.

When a UE is configured with joint encoding for a given CSI quantity, its quantization and encoding in the UCI shall be performed across relevant CSI reports (for which joint encoding is enabled).

Depending on the CSI reporting quantity, the adopted joint encoding mode may be different.

Figure 3:
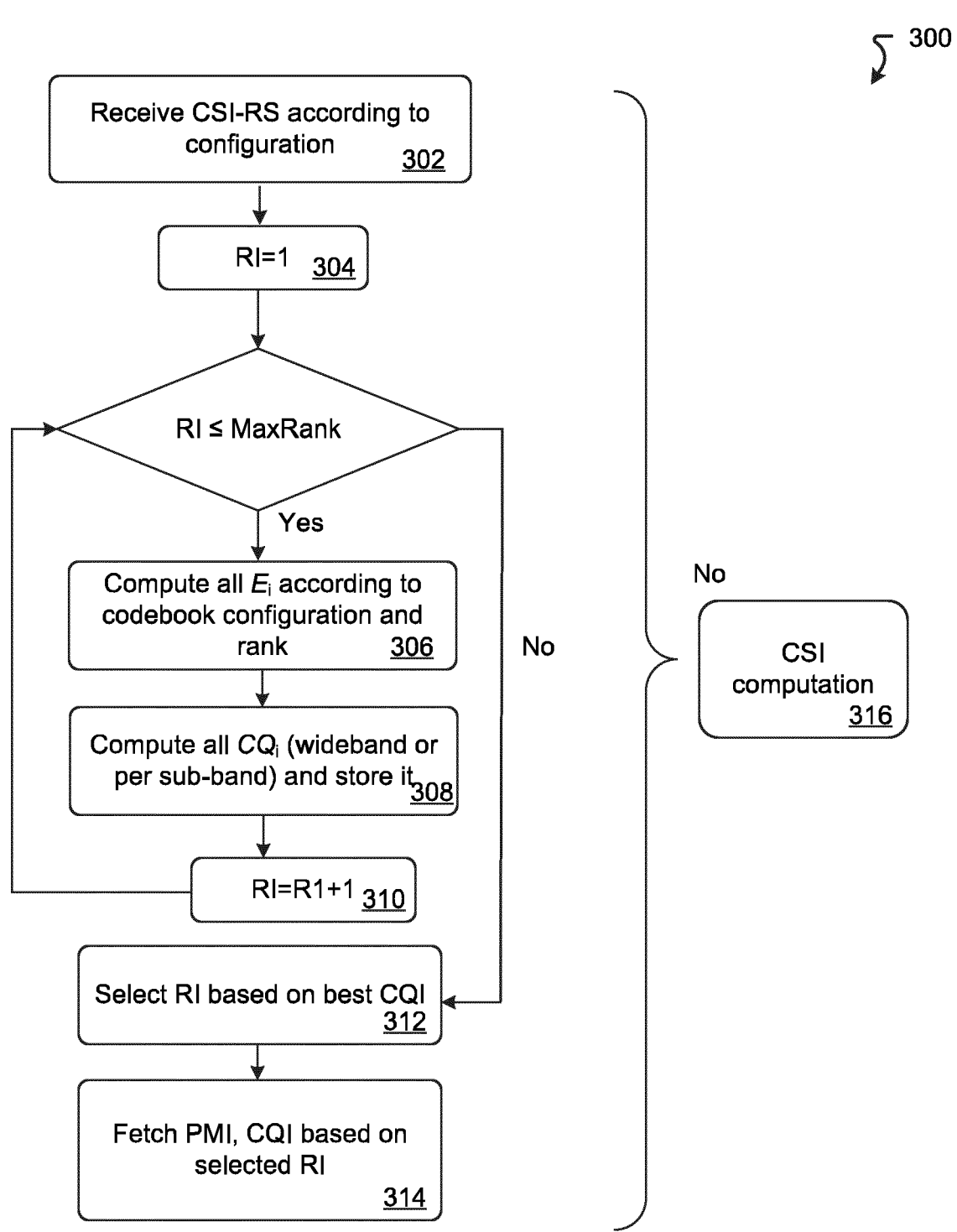
FIG. 3 is a flow chart illustrating a process of performing a CSI computation with one TRP according to an example implementation.

FIG. 3 is a flow chart illustrating a process 300 of performing a CSI computation 316 with one TRP.

At 302, a UE receives CSI-RSs according to a configuration. In some implementations, a gNB in a network configures the UE to generate CSI reports over a RRC. At 304, the UE sets a rank index (RI) to 1. If the RI is less than or equal to a specified MaxRank, then the process 300 proceed to 306; if not, then the process proceeds to 312.

At 306, the UE computes values of all parameters (Er) according to codebook configuration and rank. At 308, the UE computes all CQI (wideband or per subband) and stores it. At 310, the UE increments the rank index.

At 312, the UE selects the RI based on the best value of the CQI. At 314, the UE acquires the PMI and CQI based on the selected RI.

FIG. 4 is flow chart illustrating a process 400 of providing feedback for a CSI report. At 402, the UE performs the CSI computation 316 (see FIG. 3). At 404, the UE feeds back PMI, RI, and CQI to the TRP.

Figure 5:
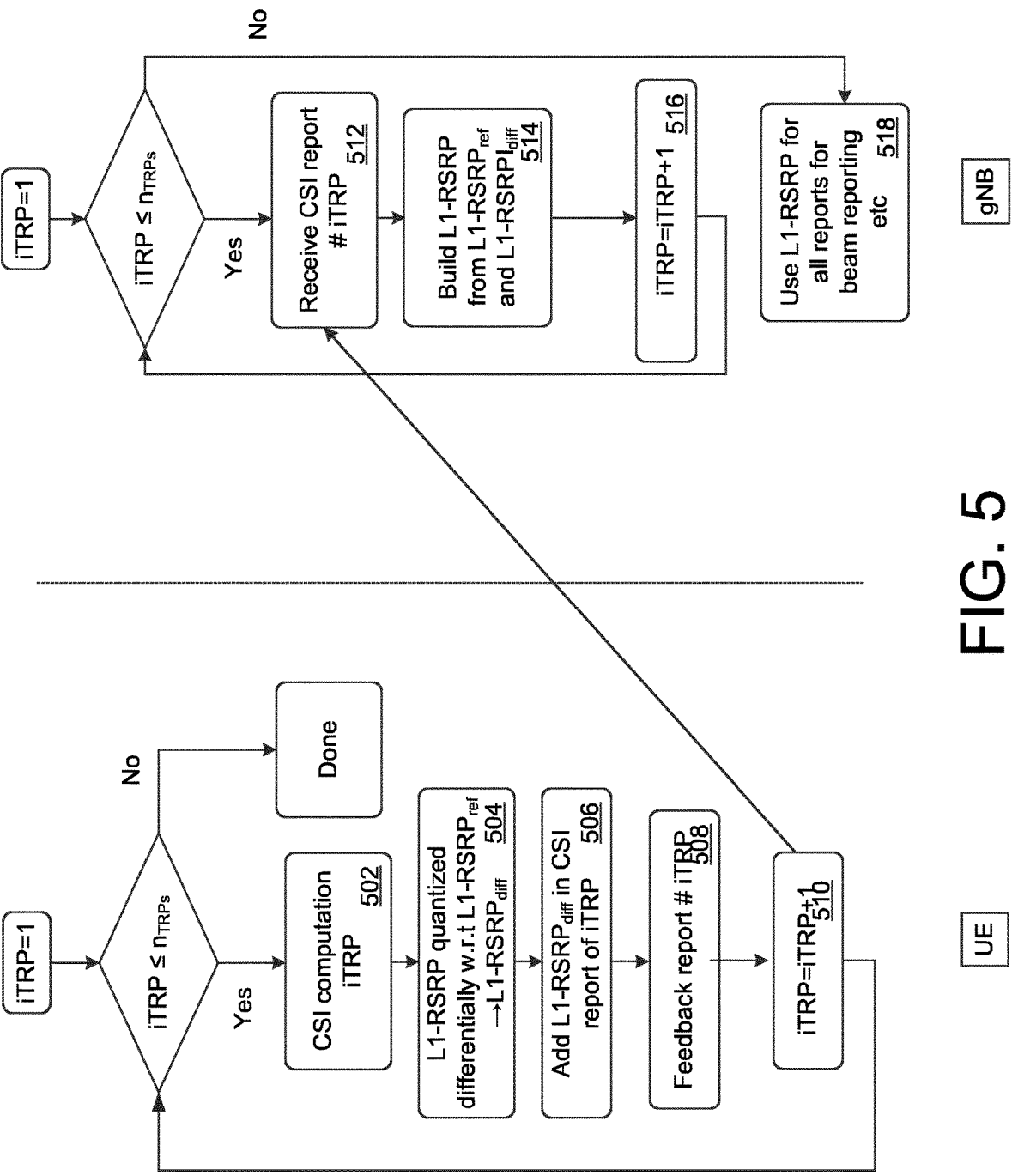
FIG. 5 is a flow chart illustrating a process of providing differential L1-RSRP reporting for multiple TRPs according to an example implementation.

FIG. 5 is a flow chart illustrating a process 500 of providing differential L1-RSRP reporting for multiple TRPs.

The UE sets the TRP index to 1. If the TRP index is less than or equal to the number of TRPs, then the process 500 proceeds to 502. If the TRP index is greater than the number of TRPs, then the process 500 is completed.

At 502, the UE performs a CSI computation for the TRP referenced by the current TRP index. At 504, the UE performs a quantization on a differential L1-RSRP relative to a reference L1-RSRP. At 506, the UE adds the quantized differential L1-RSRP to the CSI report for the TRP referenced by the current TRP index. At 508, the UE feeds back the CSI report to the TRP referenced by the current TRP index. At 515102, the UE increments the TRP index.

The gNB of the network also sets the TRP index to 1. If the TRP index is less than or equal to the number of TRPs, then the process 500 proceeds to 512. If the TRP index is greater than the number of TRPs, then the process 500 proceeds directly to 518.

At 512, the gNB receives the dependent CSI report sent by the UE for the TRP represented by the current TRP index. At 514, the gNB generates the raw value of L1-RSRP from the differential value of L1-RSRP in the dependent CSI report. At 516, the gNB increments the TRP index.

At 518, the gNB uses L1-RSRP for all reports for beamforming and other applications.

Figure 6:
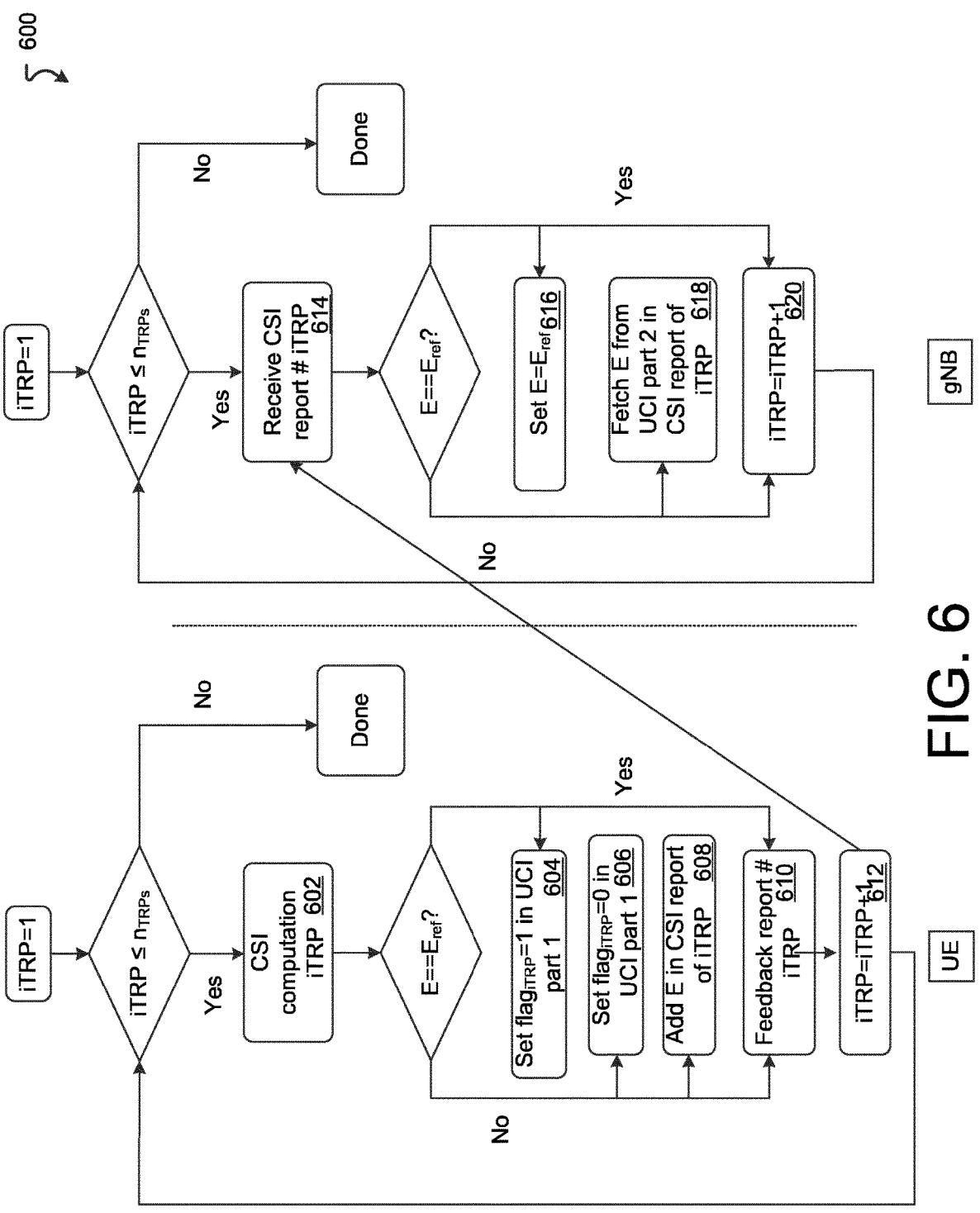
FIG. 6 is a flow chart illustrating a process of providing CSI reporting relative to a reference report according to an example implementation.

FIG. 6 is a flow chart illustrating a process 600 of providing CSI reporting relative to a reference report.

The UE sets the TRP index to 1. If the TRP index is less than or equal to the number of TRPs, then the process 600 proceeds to 602. If the TRP index is greater than the number of TRPs, then the process 600 is completed.

At 602, the UE performs a CSI computation for the TRP referenced by the current TRP index. The UE then checks whether the value of a CSI quantity of interest E is equal to a value of the CSI quantity E in a reference CSI report. If the value of E is equal to the value of E in the reference CSI report, then the value of the CSI quantity E in the dependent CSI report is replaced at 604 with a flag indicating that the value of E is the value of E in the reference CSI report in UCI part 1; the process 600 then proceeds to 610. If the value of E is not equal to the value of E in the reference CSI report, then that flag is set at 606 to indicate that the value of E is not the value of E in the reference CSI report; the UE at 608 then adds the value of E to the dependent CSI report. At 610, the UE sends the dependent CSI report to the gNB and at 612, the UE increments the TRP index.

The gNB of the network also sets the TRP index to 1. If the TRP index is less than or equal to the number of TRPs, then the process 600 proceeds to 614. If the TRP index is greater than the number of TRPs, then the process 600 is completed.

At 614, the gNB receives the dependent CSI report sent by the UE for the TRP represented by the current TRP index. If the value of E is equal to the value of E in the reference CSI report, then the value of the CSI quantity E in the dependent CSI report is replaced at 616 with the value of E in the reference CSI report; the process 600 then proceeds to 620. If the value of E is equal to the value of E in the reference CSI report, then the value of E in the reference CSI report is fetched from UCI part 2 in the dependent CSI report. At 620, the gNB increments the TRP index.

The gNB configures the UE in RRC to perform the CSI feedback in one or more of the following joint CSI feedback modes, which are:
Differential quantization
Relative CSI feedback
Partial relative CSI feedback
Moreover, gNB may choose to activate or deactivate some of these modes in more frequent signalling such as MAC-CE or DCI.

Differential quantization has the following examples.

For L1-RSRP/L1-SINR, if the joint quantization across reports is enabled and the higher layer CSI quantity nrofReportedRS is configured to be larger than one, or if the higher layer CSI quantity groupBasedBeamReporting is configured as 'enabled', the UE shall use differential L1-RSRP based reporting, where the largest measured value of L1-RSRP is quantized to a 7-bit value in the range [−140, −44] dBm with 1 dB step size. This value is taken as reference for all RSRP values. The report in which the largest RSRP value was computed, is indicated as a reference via a novel reference report indication. The largest RSRP value in the other reports are quantized differentially to a lower number of bits (e.g. 4 bits). All other RSRP values are quantized differentially to 4 bits with respect to the largest RSRP value per reports.

For L1-SINR, where the largest value across all reports is taken as a reference and quantized over 7 bits. The largest values per report would then be quantized differentially with respect to the largest L1-SINR of the reference report. All other L1-SINR values are quantized differentially with respect to the largest value within the same report.

A flag can be added in UCI part 1 which indicates whether the CSI quantity is going to be sent differentially or not. For example, with CQI feedback when the flag is set to 0, UE will send the CQI as in the spec. If flag is set to 1, UE will send back CQI differential to first report as proposed in 1a.

Relative CSI feedback for any of the following CSI quantities: PMI/CRI/CQI/RI/SSBRI/L1-SINR/L-RSRP/I1: wide band indication. A flag can be added in UCI part 1, if the flag is set to 1 UE doesn't need to feedback the CSI quantity back and gNB would instead use the CSI quantity present in reference report. If flag is set to 0, UE has to feedback the CSI quantity in UCI part 2.

Partial relative CSI feedback: For example in Type II CSI feedback, the wideband part of the PMI in a first reference report can be used as a reference in a second report, such that in the second report UE doesn't need to feedback the wideband PMI part and gNB can use the value sent in the first reference report (This includes port selection, $W_1$, $W_f$). In other words, only a part of the PMI can be taken as a reference.

For N=4 TRPs, there is a total number of 32 reports that a UE may need to feedback to gNB. In this case, the proposed approach for L1-RSRP quantization may reduce CSI reporting overhead by 93 bits.

Note that some of the previously mentioned modes can be simultaneously activated, for example UE can apply mode 1 on CQI feedback and mode 2 on PMI feedback.

Note also that all the modes mentioned above can be coupled with a rule in the spec. For example, in case RI is the same then the above methods can be applied. Moreover, another way to regulate the overhead would be that instead of using the flags in 1c and 2, the fact that the RI is the same would itself serve as a flag.

Another question would be, how to pick the reference report (or IH). Note that the reference report can be used to all CSI quantities in one dependent report or it can be selected differently for the different CSI quantities within 1 dependent report, i.e. reference report can be used per CSI quantity or per report. There could be several criteria in which the reference report is determined:

UE can send feedback index of a common favorite interference hypothesis that is used for all other reports for all TRPs. To determine which report with the common FIH is used as a reference.

Either via a rule, i.e. the report which corresponds to the highest CQI

On top of common FIH, UE feeds back index of report, added overhead is $\log_2$ M, M≤N is the number of TRPs considered in the FIH.

UE can send feedback of the index of a favorite interference hypothesis (FIH) for each TRP in UCI part 1 and the report within the FIH which corresponds to one TRP would be this would be taken as the reference report for that TRP. The overhead required here is N bits (for fay. IH) per TRP.

UE can send feedback of the index of a common reference report index (RRI) for all CSI reports in UCI part 1 and that report would be taken as the reference report for all other CSI reports. The overhead required here is $\log_2$ ($N2^{N-1}$) bits (for RRI).

For each report, UE may have the option to send an index of a reference report. In addition, gNB can interpret this index by assuming all CSI components in new report are identical to all CSI components in reference report. Note that overhead is higher than in second variant.

In addition, the reference report can be chosen according to a rule in the spec. For example, following the order of the CSI reports, the first occurrence of a CSI report of a particular TRP is taken as the reference report for that TRP in all coming reports. Referring to the example in FIG. 2, this means that report #1 and report #2 are taken as reference reports for report #3 and report #4 respectively. In general, in order to reduce the UL overhead, the UE can be configured to apply a first selection, where UE would feedback only a subset of the CSI reports which belong to a subset of the different IHs. For example, UE would feedback only the CSI reports which belong to the K best IHs. The best IHs can be selected for example assuming the highest CQI.

Example 1-1: FIG. 7 is a flow chart illustrating an example method 700 of performing the improved techniques. Operation 710 includes receiving, by a user equipment (UE), a plurality of channel state information reference signals (CSI-RSs), each of the plurality of CSI-RSs being sent from a respective transmission and reception point (TRP) of a plurality of TRPs. Operation 720 includes obtaining, by the UE, measurements on the plurality of CSI-RSs to generate values of CSI quantities for a respective CSI report of a plurality of CSI reports, each CSI quantity being generated according to a respective interference hypothesis (IH) of a plurality of IHs, each of the plurality of IHs corresponding to a respective subset of the plurality of TRPs, each of the plurality of CSI reports having values of the CSI quantities. Operation 730 includes selecting, by the UE, a subset of the plurality of CSI reports as reference CSI reports of a set of reference CSI reports. Operation 740 includes generating, by the UE for the rest of the plurality of channels, a plurality of dependent CSI reports, each of the plurality of dependent CSI reports replacing a value of the CSI quantity with a secondary value of the CSI quantity, the secondary value of the CSI quantity included in that dependent CSI report, in combination with the value of the CSI quantity included in a reference CSI report of the set of reference CSI reports, producing the value of the CSI quantity of the channel of the plurality of channels. Operation 750 includes transmitting the set of reference CSI reports and the plurality of dependent CSI reports to the plurality of TRPs.

Example 1-2: According to an example implementation of example 1-1, further comprising receiving configuration information via a radio resource control (RRC), the configuration information indicating a mode in which the UE generates the plurality of dependent CSI reports, the mode including at least one of a differential quantization mode, a relative CSI feedback mode, and a partial relative CSI feedback mode.

Example 1-3: According to an example implementation of example 1-2, wherein the differential quantization mode includes replacing, as the CSI quantity, a layer 1 reference signal received power (L1-RSRP) value with a value of a differential L1-RSRP in a dependent CSI report of the plurality of dependent CSI reports.

Example 1-4: According to an example implementation of example 1-3, wherein the value of the differential L1-RSRP in the dependent CSI report is quantized to a specified number of bits, the number of bits of the quantized value of the differential L1-RSRP being less than a number of bits of the value of the L1-RSRP in a reference CSI report of the plurality of reference CSI reports.

Example 1-5: According to an example implementation of example 1-2, wherein the differential quantization mode includes replacing, as the CSI quantity, a layer 1 signal to interference and noise ratio (L1-SINR) value with a differential L1-SINR in a dependent CSI report of the plurality of dependent CSI reports.

Example 1-6: According to an example implementation of example 1-5, wherein the value of the differential L1-SINR in the dependent CSI report is quantized to a specified number of bits, the number of bits of the quantized value of the differential L1-SINR being less than a number of bits of the value of the L1-SINR in a reference CSI report of the plurality of reference CSI reports.

Example 1-7: According to an example implementation of example 1-2, wherein the differential quantization mode includes adding a flag in an uplink control information (UCI), the flag indicating whether a value of a CSI quantity in a dependent CSI report of the plurality of dependent CSI reports is to be replaced with a differential value of the CSI quantity.

Example 1-8: According to an example implementation of example 1-2, wherein the relative CSI feedback mode includes adding a flag in an uplink control information (UCI), the flag indicating whether a value of a CSI quantity in a dependent CSI report of the plurality of dependent CSI reports is to be located in a reference CSI report of the plurality of reference CSI reports.

Example 1-9: According to an example implementation of any of examples 1-7 and 1-8, wherein the CSI quantity is one of a precoding matrix indicator (PMI), channel quality indicator (CQI), rank indicator (RI), Synchronization Signal Block Resource Indicator (SSBRI), layer 1 reference signal received power (L1-RSRP), or layer 1 signal to interference and noise ratio (L1-SINR).

Example 1-10: According to an example implementation of example 1-8, wherein the flag further indicates whether a relative CSI feedback is active and provides a value of a reference report index identifying a reference report.

Example 1-11: According to an example implementation of example 1-2, wherein the partial relative CSI feedback mode includes, for a precoding matrix indicator (PMI) with a wideband portion and a subband portion, only including the subband portion in the plurality of dependent CSI reports and reference the wideband portion in a reference CSI report of the plurality of reference CSI reports.

Example 1-12: According to an example implementation of example 1-11, wherein in response to the subband portion of the PMI in a dependent report matches the subband portion of the PMI in the reference CSI report, replacing the subband portion with a flag indicating that the subband portion is located in in the reference CSI report.

Example 1-13: According to an example implementation of example 1-1, receiving configuration information via a radio resource control (RRC), the configuration information indicating that the at least one of the plurality of channels selected to receive the reference CSI report is to be selected according to a set of rules.

Example 1-14: According to an example implementation of example 1-13, wherein the set of rules includes indicating that a value of a CSI quantity in a dependent CSI report equal to the value of the CSI quantity in a reference CSI report is not to be included in the dependent CSI report.

Example 1-15: According to an example implementation of example 1-1, further comprising: selecting an IH of the plurality of IHs as a favorite IH (FIH) for a specified TRP according to a set of rules; and transmitting data to the specified TRP, the data representing the selected FIH.

Example 1-16: According to an example implementation of example 1-15, wherein a rule of the set of rules indicates that the FIH is selected by determining the channel of the plurality of channels having the largest value of a channel quality indicator (CQI).

Example 1-17: According to an example implementation of example 1-1, wherein a dependent CSI report of the plurality of dependent CSI reports includes a pointer to a reference CSI report of the plurality of reference CSI reports.

Example 1-18: According to an example implementation of example 1-1, wherein a value of a CSI quantity in a dependent report of the plurality of dependent CSI reports includes a pointer to the CSI quantity in a reference CSI report of the set of reference CSI reports.

Example 1-19: According to an example implementation of example 1-1, further comprising selecting at least one of the TRPs of the plurality of TRPs to receive a reference CSI report of the plurality of CSI reports.

Example 1-20: According to an example implementation of example 1-1, further comprising selecting a subset of the plurality of CSI reports which belong to one or more of the IHs to be transmitted by UE and ignoring the rest.

Example 1-21: An apparatus comprising means for performing a method of any of examples 1-1 to 1-20.

Example 1-22: A computer program product including a non-transitory computer-readable storage medium and storing executable code that, when executed by at least one data processing apparatus, is configured to cause the at least one data processing apparatus to perform a method of any of examples 1-1 to 1-20.

Example 2-1: FIG. 8 is a flow chart illustrating an example method 400 of performing the improved techniques. Operation 810 includes receiving, by a first transmission and reception point (TRP) of a plurality of TRPs of a network, a dependent channel state information (CSI) report, the dependent CSI report including a first value of a CSI quantity and a pointer to a reference CSI report received by a second TRP of the network. Operation 820 includes accessing, by the first TRP, a second value of the CSI quantity in the reference CSI report. Operation 830 includes generating, by the first TRP, a combined value of the CSI quantity based on the first value of the CSI quantity and the second value of the CSI quantity.

Example 2-2: According to an example implementation of example 2-1, wherein the first value of the CSI quantity is a differential value of the CSI quantity, and wherein generating the combined value of the CSI quantity includes adding the first value of the CSI quantity and the second value of the CSI quantity.

Example 2-3: According to an example implementation of example 2-1, wherein the first value of the CSI quantity is a flag indicating that the second value of the CSI quantity is the combined value of the CSI quantity.

Example 2-4: According to an example implementation of example 2-1, wherein the first TRP is different from the second TRP.

Example 2-5: An apparatus comprising means for performing a method of any of examples 2-1 to 2-4.

Example 2-6: A computer program product including a non-transitory computer-readable storage medium and storing executable code that, when executed by at least one data processing apparatus, is configured to cause the at least one data processing apparatus to perform a method of any of examples 2-1 to 2-4.

List of Example Abbreviations

Figure 9:
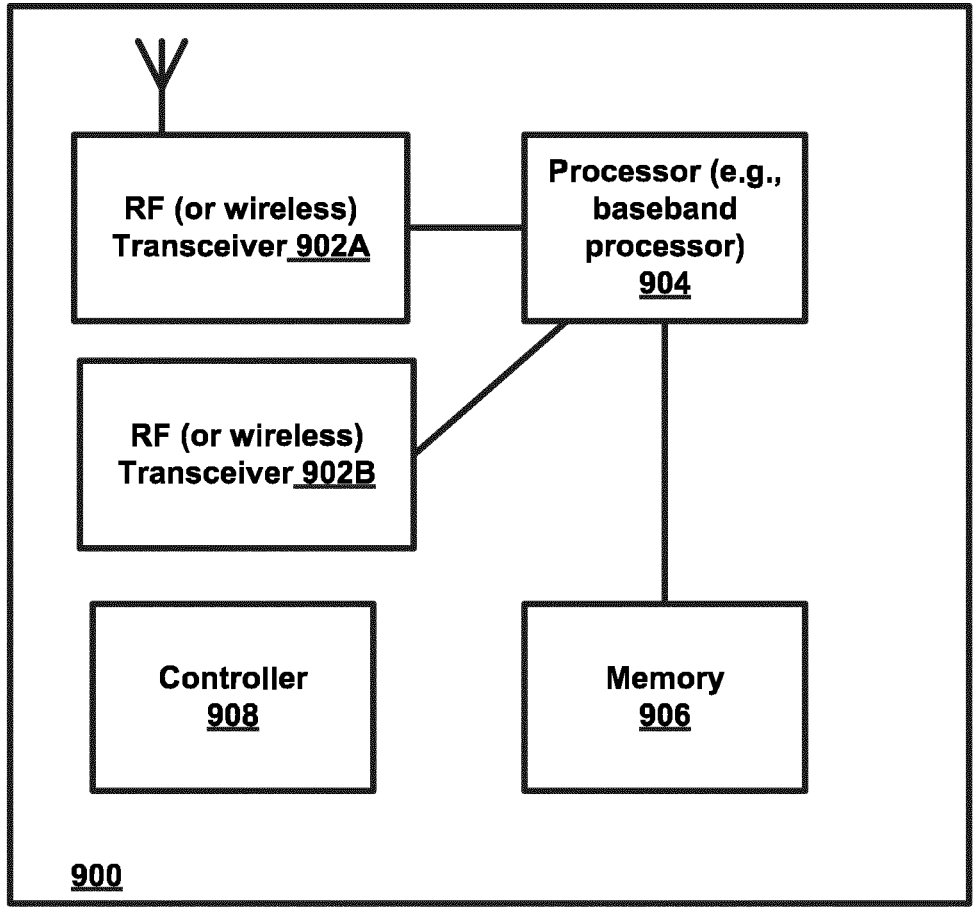
FIG. 9 is a block diagram of a node or wireless station (e.g., base station/access point, relay node, or mobile station/user device) according to an example implementation

CMR Channel Measurement Resources
IMR Interference Measurement Resources
CSI Channel State Information
CSI-RS Channel State Information-Reference Signal
CQI Channel Quality Indicator
DCI Downlink Control Information
DPS Dynamic Point Selection
FD frequency domain
FR2 Frequency Range 2
GoB grid-of-beam
gNB g Node B (basestation in NR)
IMR Interference Measurement Resources
JT Joint Transmission
L1 Layer 1
L1-RSRP layer 1 Reference Signals Received Power
MAC CE MAC Control Element
NR New Radio
PMI Precoding Matrix Indicator
PUCCH Physical Uplink Control Channel
PUSCH Physical Uplink Shared Channel
PDSCH Physical Downlink Shared Channel
PDCCH Physical Downlink Control Channel
RI Rank Indicator
RSRP Reference Signals Received Power
SD space domain
SRS sounding reference signals
SSB Synchronization Signal Block
SSBRI Synchronization Signal Block Resource Indicator
TXRU Transmission Receive Unit
UCI Uplink control Signaling
UE User equipment FIG. 9 is a block diagram of a wireless station (e.g., AP, BS, e/gNB, NB-IoT UE, UE or user device) 900 according to an example implementation. The wireless station 900 may include, for example, one or two RF (radio frequency) or wireless transceivers 902A, 902B, where each wireless transceiver includes a transmitter to transmit signals (or data) and a receiver to receive signals (or data). The wireless station also includes a processor or control unit/entity (controller) 904 to execute instructions or software and control transmission and receptions of signals, and a memory 906 to store data and/or instructions.

Processor 904 may also make decisions or determinations, generate slots, subframes, packets or messages for transmission, decode received slots, subframes, packets or messages for further processing, and other tasks or functions described herein. Processor 904, which may be a baseband processor, for example, may generate messages, packets, frames or other signals for transmission via wireless transceiver 902 (902A or 902B). Processor 904 may control transmission of signals or messages over a wireless network, and may control the reception of signals or messages, etc., via a wireless network (e.g., after being down-converted by wireless transceiver 902, for example). Processor 904 may be programmable and capable of executing software or other instructions stored in memory or on other computer media to perform the various tasks and functions described above, such as one or more of the tasks or methods described above. Processor 904 may be (or may include), for example, hardware, programmable logic, a programmable processor that executes software or firmware, and/or any combination of these. Using other terminology, processor 904 and transceiver 902 together may be considered as a wireless transmitter/receiver system, for example.

In addition, referring to FIG. 9, a controller (or processor) 908 may execute software and instructions, and may provide overall control for the station 900, and may provide control for other systems not shown in FIG. 9, such as controlling input/output devices (e.g., display, keypad), and/or may execute software for one or more applications that may be provided on wireless station 900, such as, for example, an email program, audio/video applications, a word processor, a Voice over IP application, or other application or software.

In addition, a storage medium may be provided that includes stored instructions, which when executed by a controller or processor may result in the processor 904, or other controller or processor, performing one or more of the functions or tasks described above.

According to another example implementation, RF or wireless transceiver(s) 902A/902B may receive signals or data and/or transmit or send signals or data. Processor 904 (and possibly transceivers 902A/902B) may control the RF or wireless transceiver 902A or 902B to receive, send, broadcast or transmit signals or data.

The embodiments are not, however, restricted to the system that is given as an example, but a person skilled in the art may apply the solution to other communication systems. Another example of a suitable communications system is the 5G concept. It is assumed that network architecture in 5G will be quite similar to that of the LTE-advanced. 5G is likely to use multiple input-multiple output (MIMO) antennas, many more base stations or nodes than the LTE (a so-called small cell concept), including macro sites operating in co-operation with smaller stations and perhaps also employing a variety of radio technologies for better coverage and enhanced data rates.

It should be appreciated that future networks will most probably utilise network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations may be carried out, at least partly, in a server, host or node operationally coupled to a remote radio head. It is also possible that node operations will be distributed among a plurality of servers, nodes or hosts. It should also be understood that the distribution of labour between core network operations and base station operations may differ from that of the LTE or even be non-existent.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device or in a propagated signal, for execution by, or to control the operation of, a data processing apparatus, e.g., a programmable processor, a computer, or multiple computers. Implementations may also be provided on a computer readable medium or computer readable storage medium, which may be a non-transitory medium. Implementations of the various techniques may also include implementations provided via transitory signals or media, and/or programs and/or software implementations that are downloadable via the Internet or other network(s), either wired networks and/or wireless networks. In addition, implementations may be provided via machine type communications (MTC), and also via an Internet of Things (IOT).

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers.

Furthermore, implementations of the various techniques described herein may use a cyber-physical system (CPS) (a system of collaborating computational elements controlling physical entities). CPS may enable the implementation and exploitation of massive amounts of interconnected ICT devices (sensors, actuators, processors microcontrollers, . . . ) embedded in physical objects at different locations. Mobile cyber physical systems, in which the physical system in question has inherent mobility, are a subcategory of cyber-physical systems. Examples of mobile physical systems include mobile robotics and electronics transported by humans or animals. The rise in popularity of smartphones has increased interest in the area of mobile cyber-physical systems. Therefore, various implementations of techniques described herein may be provided via one or more of these technologies.

A computer program, such as the computer program(s) described above, can be written in any form of programming language, including compiled or interpreted languages, and can be deployed in any form, including as a stand-alone program or as a module, component, subroutine, or other unit or part of it suitable for use in a computing environment. A computer program can be deployed to be executed on one computer or on multiple computers at one site or distributed across multiple sites and interconnected by a communication network.

Method steps may be performed by one or more programmable processors executing a computer program or computer program portions to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer, chip or chipset. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semi-conductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, implementations may be implemented on a computer having a display device, e.g., a cathode ray tube (CRT) or liquid crystal display (LCD) monitor, for displaying information to the user and a user interface, such as a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the various embodiments.

What is claimed is:

1. An apparatus, comprising:
   at least one processor; and
   at least one non-transitory memory storing instructions that, when executed with the at least one processor, cause the apparatus at least to:
      receive a plurality of channel state information reference signals (CSI-RSs), each of the plurality of CSI-RSs being sent from a respective transmission and reception point (TRP) of a plurality of TRPs;
      obtain measurements on the plurality of CSI-RSs to generate values of channel state information (CSI)

quantities for a respective CSI report of a plurality of CSI reports, each CSI quantity being generated according to a respective interference hypothesis of a plurality of interference hypotheses, each of the plurality of interference hypotheses corresponding to a respective subset of the plurality of TRPs, each CSI report of the plurality of CSI reports consisting of values of all of the following CSI quantities;
channel quality indicator (CQI),
precoding matrix indicator (PMI),
CSI-RS resource indicator (CRI),
rank indicator (RI),
wide band indication (I1)
SSB resource indicator (SSBRI),
reference signal received power (L1-RSRP), and
signal to interference and noise ratio (L1-SINR);
select a subset of the plurality of CSI reports as reference CSI reports of a set of reference CSI reports;
receive configuration information via a radio resource control, the configuration information indicating that joint encoding is to be performed for a set of CSI reporting configurations that are associated with a same trigger state and have a same slot periodicity and offset, the configuration information further indicating a differential quantization mode in which the apparatus generates a plurality of dependent CSI reports,
wherein the differential quantization mode includes replacing, as a CSI quantity value, each of the following CSI quantities:
precoding matrix indicator (PMI),
CSI-RS resource indicator (CRI), rank indicator (RI),
wide band indication (I1)
SSB resource indicator (SSBRI),
reference signal received power (L1-RSRP), and
signal to interference and noise ratio (L1-SINR),
with a respective value of a respective differential CSI quantity in a dependent CSI report of the plurality of dependent CSI reports,
wherein the value of the differential CSI quantity in the dependent CSI report is quantized to a specified number of bits, the number of bits of the quantized value of the differential CSI quantity being less than a number of bits of the value of the CSI quantity in a reference CSI report of the plurality of reference CSI reports,
wherein in each dependent CSI report, each CSI quantity of the dependent CSI report has a different respective reference CSI report;
generate, for the rest of the plurality of channels, the plurality of dependent CSI reports, each of the plurality of dependent CSI reports replacing a value of the CSI quantity with a secondary value of the CSI quantity, the secondary value of the CSI quantity included in that dependent CSI report, in combination with the value of the CSI quantity included in a reference CSI of the set of reference CSI reports, producing the value of the CSI quantity of the channel of the plurality of channels; and
transmit the set of reference CSI reports and the plurality of dependent CSI reports to the plurality of transmission and reception points.

* * * * *